United States Patent Office 3,476,811
Patented Nov. 4, 1969

3,476,811
FLUORINATED DIALKYL SULFIDES
Ross C. Terrell, Birmingham, England, assignor to Air Reduction Company, Incorporated, New York, N.Y., a corporation of New York
No Drawing. Filed Dec. 12, 1966, Ser. No. 600,759
Int. Cl. C07c 149/10; B01f 1/00
U.S. Cl. 260—609
4 Claims

ABSTRACT OF THE DISCLOSURE

A group of 2,2,2-trifluoroethyl alkyl sulfides having the following formula:

R—S—CH$_2$CF$_3$ wherein R is a methyl, ethyl or hydroxy substituted methyl or ethyl. The compounds are prepared through the reaction of 2,2,2-trifluoroethyl-p-toluene sulfonate with an alkali metal substituted mercaptan wherein the alkyl portion of the mercaptan (R) is as previously defined. The compounds are useful in making solutions and dispersions of fluorinated materials.

---

This invention relates to fluorinated dialkyl sulfides, and is more particularly concerned with fluorinated dialkyl sulfides wherein a terminal carbon atom of an alkyl group is substituted by three fluorine atoms.

Halogenated dialkyl sulfides are known and some of the known halogenated dialkyl sulfides also contain fluorine atoms. It is, however, an object of this invention to provide a novel class of fluorinated dialkyl sulfides which are readily prepared from commercially available raw materials.

The fluorinated dialkyl sulfides of this invention have the following formula:

R—S—CH$_2$—CF$_3$      (1)

wherein R is a methyl or ethyl radical, which may be substituted by a hydroxyl group. Representative fluorinated dialkyl sulfides of this invention having the foregoing Formula 1 are 2,2,2-trifluoroethyl ethyl sulfide (CH$_3$—CH$_2$—S—CH$_2$—CF$_3$), 2,2,2-trifluoroethyl methyl sulfide (CH$_3$—S—CH$_2$—CF$_3$), and 2,2,2-trifluoroethyl-2′-hydroxyethyl sulfide (OH—CH$_2$—CH$_2$—S—CH$_2$—CF$_3$)

The compounds of Formula 1 are readily prepared by reacting 2,2,2-trifluoroethyl-p-toluene sulfonate (commonly referred to as 2,2,2-trifluoroethyl tosylate) with the alkali metal salt of a mercaptan of the formula RSH, wherein R has the meaning specified above. The alkali metal salt may be formed in situ by combining the mercaptan with, for example, an alkali metal hydroxide, preferably potassium hydroxide, or an alkali metal alkoxide, preferably sodium methoxide. The reaction between the mercaptan alkali metal salt and the tosylate may be carried out in the presence of an inert organic solvent, if desired, and a particularly suitable solvent, when one is used, is dimethyl sulfoxide. The mercaptan salt and the tosylate are used in equimolecular quantities, although an excess of one or the other of the reactants may be employed if desired. When the mercaptan salt is formed in situ, at least one mole of the alkali metal reactant, e.g. hydroxide or alkoxide, is used per mole of mercaptan. However, the alkali metal reactant is preferably used in slight molar excess, e.g. 25% excess.

If the reactants do not readily interreact at room temperature, the reactant mixture is heated sufficiently to cause the reaction to progress. The temperature to which the reactant mixture needs to be heated will vary from compound to compound, but ordinarily the mixture is heated to a temperature in the range 50–125° C. The reaction is continued until no further reaction occurs and the product is advantageously continuously removed from the reaction mixture by distillation, a condenser being connected to the reaction vessel.

EXAMPLE 1

Preparation of 2,2,2-trifluoroethyl methyl sulfide
(CH$_3$SCH$_2$CF$_3$)

To 70 g. of KOH (1.25 moles) in 30 cc. H$_2$O in a glass flask equipped with a condenser was added slowly 50 g. of methyl mercaptan. To the mixture was added 254 g. (1 mole) of 2,2,2-trifluoroethyl tosylate in 200 cc. dimethyl sulfoxide. The reaction was heated to 85° C. and as the reaction progressed 50 g. of material, B.P. 65–70°, was distilled out of the reactor. An additional 500 cc. of H$_2$O was added and 60 grams more of material, B.P. 65–80° C., was distilled out. The two distillates were combined, washed with dilute NaOH, and water, and dried over MgSO$_4$. 107 grams of material were recovered.

This material was distilled through a 45 x 1 cm. column packed with metal helices to yield 49 grams of

CH$_3$SCH$_2$CF$_3$

B.P. 67.6° C. at 760 mm., N$_D^{20}$ 1.3658, 99.8% pure.
Calc. for C$_3$H$_5$F$_3$S: C, 27.69; H, 3.84. Found: C, 27.73; H, 3.87.

EXAMPLE 2

Preparation of 2,2,2-trifluoroethyl ethyl sulfide
(CH$_3$CH$_2$SCH$_2$CF$_3$)

To 70 grams of KOH (1.25 moles) in 200 cc. of H$_2$O in a glass flask equipped with a condenser was added slowly 62 g. (1 mole) of ethyl mercaptan and 254 grams (1 mole) of 2,2,2-trifluoroethyl tosylate in 200 cc. dimethyl sulfoxide. The product was heated to 100–105° C. and as the reaction progressed 113 grams of material, B.P. 90–95°, was distilled out. This material was washed with dilute NaOH and H$_2$O, dried over MgSO$_4$ to yield 96 g. of dried material.

The dried material was distilled through a 125 x 1 cm. metal packed column to yield 38 grams of

CH$_3$CH$_2$SCH$_2$CF$_3$

B.P. 89.9–90° C. at 760 mm., N$_D^{20}$ 1.3778.
Calc. for C$_4$H$_7$F$_3$S: C, 33.33; H, 4.85. Found: C, 33.65; H, 4.76.

EXAMPLE 3

Preparation of 2,2,2-trifluoroethyl-2′-hydroxyethyl sulfide
(OHCH$_2$CH$_2$SCH$_2$CF$_3$)

To a mixture of 39 g. of 2-hydroxyethyl mercaptan (0.5 mole) and sodium methoxide (27 g.) in a glass flask was added molten 2,2,2-trifluoroethyl-p-toluene sulfonate 127 g. (0.5 mole). On heating to 90° C. there was an exothermic reaction with a heavy precipitate formed, making the reaction too thick to stir. The addition of mineral oil (50 cc.) did not thin the reaction. The reaction mixture was extracted with ether and the ether extract distilled to yield 40 g. of material (50% pure, B.P. 80–82° C./15 mm.).

The impure fraction was distilled to yield

OHCH$_2$CH$_2$SCH$_2$CF$_3$

B.P. 82°/14 mm., N$_D^{20}$ 1.4193, 99.9+percent pure.
Calc. for C$_4$H$_7$F$_3$OSC: C, 30.00; H, 4.35; F, 35.3. Found: C, 30.11; H, 3.52; F, 35.4.

The fluorinated dialkyl sulfides of this invention are readily miscible with other organic liquids, including fats and oils, and they have useful solvent properties such as, for example as solvents for fluorinated olefins and other fluorinated materials, such for example as fluorowaxes. This can be used to prepare pastes and dispersions of such materials useful for coatings and the like, and they can also be used as degreasing agents.

I claim:
1. A fluorinated dialkyl sulfide of the formula

$$R-S-CH_2-CF_3$$

wherein R is an alkyl or a hydroxy-substituted alkyl radical selected from the group consisting of $CH_3-$, $CH_3CH_2-$, $HOCH_2-$, and $HOCH_2CH_2-$.

2. A fluorinated dialkyl sulfide as defined in claim 1, wherein R is a methyl radical.

3. A fluorinated dialkyl sulfide as defined in claim 1, wherein R is an ethyl radical.

4. A fluorinated dialkyl sulfide as defined in claim 1, wherein R is the $OHCH_2CH_2-$ radical.

References Cited

UNITED STATES PATENTS 3,006,964   10/1961   Oesterling _____ 260—609 XR

OTHER REFERENCES

Harris et al.: "J. Amer. Chem. Soc.," vol. 83 (1961), pp. 840–45.

CHARLES B. PARKER, Primary Examiner

D. R. PHILLIPS, Assistant Examiner

U.S. Cl. X.R.

252—364